US006606781B1

(12) United States Patent
Gill

(10) Patent No.: US 6,606,781 B1
(45) Date of Patent: Aug. 19, 2003

(54) METHOD OF MAKING DOUBLE TUNNEL JUNCTION WITH MAGNETORESISTANCE ENHANCEMENT LAYER

(75) Inventor: Hardayal Singh Gill, Portola Valley, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 305 days.

(21) Appl. No.: 09/694,733

(22) Filed: Oct. 23, 2000

Related U.S. Application Data

(62) Division of application No. 09/196,446, filed on Nov. 19, 1998, now Pat. No. 6,178,074.

(51) Int. Cl.$^7$ .................... G11B 5/127; G11B 5/033; H04R 31/00
(52) U.S. Cl. .................... 29/603.08; 29/603.11; 29/603.13; 29/603.14; 360/324.2; 360/313
(58) Field of Search ............... 29/603.08, 603.11, 29/603.13, 603.14; 360/324.2, 313, 314, 315

(56) References Cited

U.S. PATENT DOCUMENTS

| | | | |
|---|---|---|---|
| 5,390,061 A | 2/1995 | Nakatani et al. | 360/324.2 |
| 5,629,922 A | 5/1997 | Moodera et al. | 369/126 |
| 5,636,093 A | 6/1997 | Gijs et al. | 360/126 |
| 5,650,958 A * | 7/1997 | Gallagher et al. | 365/173 |
| 5,654,566 A | 8/1997 | Johnson | 257/295 |
| 5,708,358 A | 1/1998 | Ravipati | 324/252 |
| 5,715,121 A * | 2/1998 | Sakakima et al. | 360/324.2 |
| 5,747,859 A * | 5/1998 | Mizushima et al. | 360/324.2 |
| 5,757,056 A * | 5/1998 | Chui | 257/421 |
| 5,898,548 A * | 4/1999 | Dill et al. | 360/324.2 |
| 5,936,293 A * | 8/1999 | Parkin | 257/422 |
| 5,966,275 A * | 10/1999 | Iijima | 360/324.2 |
| 5,986,858 A * | 11/1999 | Sato et al. | 360/324.2 |
| 6,005,753 A * | 12/1999 | Fontana, Jr. et al. | 360/324.2 |
| 6,175,476 B1 * | 1/2001 | Huai et al. | 360/324.11 |
| 6,211,559 B1 * | 4/2001 | Zhu et al. | 257/421 |

FOREIGN PATENT DOCUMENTS

| | | | |
|---|---|---|---|
| JP | 7-210832 | * | 8/1995 |
| JP | 10-91925 | * | 4/1998 |

OTHER PUBLICATIONS

"Large Magnetoresistance at Room Temperature in Ferromagnetic Thin Film Tunnel Junctions", Physical Review Letters, vol. 74, No. 16, Apr. 17, 1995.
"Spin–Polarized Transport", Physics Today, Prinz, Gary A., Apr. 1995.

* cited by examiner

Primary Examiner—Carl J. Arbes
Assistant Examiner—Thiem Dea Phan
(74) Attorney, Agent, or Firm—Ervin F. Johnston

(57) ABSTRACT

An apparatus and method is disclosed for an enhanced double tunnel junction sensor which utilizes an enhancement layer(s) to enhance magnetoresistance (MR coefficient) and resonant tunneling. Additionally, a combined read/write head and disk drive system is disclosed utilizing the enhanced double tunnel junction sensor of the present invention. The enhancement layers improve the resonant tunneling and boost the MR coefficient to achieve a higher tunnel magnetoresistance (TMR) for the structure with applied dc bias. This is accomplished by using enhancement layers that create a quantum well between the enhancement layer and the pinned layer, which causes resonance, enhancing the tunneling electrons. By doing this, the tunneling constraints on the free layer are decoupled, allowing the free layer to be made thicker which results in reducing or eliminating free layer magnetic saturation caused by an external magnetic source. As the enhanced double tunnel junction sensor is positioned over the magnetic disk, the external magnetic fields sensed from the rotating disk moves the direction of magnetic moment of the free layer up or down, changing the resistance through the tunnel junction sensor. As the tunnel current is conducted through the tunnel junction sensor, the increase and decrease of electron tunneling (i.e., increase and decrease in resistance) are manifested as potential changes. These potential changes are then processed as readback signals by the processing circuitry of the disk drive.

40 Claims, 8 Drawing Sheets

METHOD OF MAKING DOUBLE TUNNEL JUNCTION WITH MAGNETORESISTANCE ENHANCEMENT LAYER

REFERENCE TO RELATED APPLICATION

This application is a divisional of application Ser. No. 09/196,446 filed Nov. 19, 1998, now U.S. Pat. No. 6,178,074B1.

BACKGROUND OF THE INVENTION

1. Field of the Invention

The present invention relates to a double tunnel junction structure used as a tunnel junction sensor in a magnetic head, and more particularly, to a double tunnel junction structure having enhancement layers that boost the magnetoresistance with multiple barriers used to eliminate the effect of the applied dc bias without reduction in spin polarized tunneling.

2. Description of the Related Art

A read head employing a read sensor may be combined with an inductive write head to form a combined magnetic head. In a magnetic disk drive, an air bearing surface (ABS) of the combined magnetic head is supported adjacent a rotating disk to write information on or read information from the disk. Information is written to the rotating disk by magnetic fields which fringe across a gap between the first and second pole pieces of the write head. In a read mode, the resistance of the read sensor changes proportionally to the magnitudes of the magnetic fields from the rotating disk. When a current is conducted through the read sensor, resistance changes cause potential changes that are detected and processed as playback signals.

A read sensor is employed by a magnetic head for sensing magnetic fields from moving magnetic media, such as a magnetic disk or a magnetic tape. One type of read sensor employs a tunnel junction sensor. The typical tunnel junction sensor includes a nonmagnetic spacer layer sandwiched between first and second ferromagnetic layers, commonly called a pinned layer, and a free layer. The magnetization of the pinned layer is pinned 90° to the magnetization of the free layer and the magnetization of the free layer is free to respond to external magnetic fields. The magnetization of the pinned layer is typically pinned by exchange coupling with an antiferromagnetic pinning layer.

The tunnel junction sensor is based on the phenomenon of spin-polarized electron tunneling. The typical tunnel junction sensor uses ferromagnetic metal electrodes, such as NiFe or CoFe, having high coercivity with a spacer layer that is thin enough that quantum mechanical tunneling occurs between the ferromagnetic layers (FM/I/FM). The tunneling phenomenon is electron spin dependent, making the magnetic response of the tunnel junction sensor a function of the relative orientations and spin polarization of the two ferromagnetic layers. The details of tunnel junction structures have been described in the commonly assigned U.S. Pat. No. 5,650,958 to Gallagher et al., which is incorporated by reference herein.

FIG. 1 shows tunnel magnetoresistance (TMR) as a function of dc bias for a tunnel junction sensor. At low dc bias, the conduction varies only slightly with the dc bias. As the dc bias increases, the TMR coefficient drops noticeably. For example, the application of 300 mV bias across a tunnel junction structure having a structure comprising ferromagnetic/insulator/ferromagnetic (FM/I/FM) reduces the TMR by half.

To solve this problem, another type of tunnel junction sensor has been proposed called a double junction sensor (FM/I/FM/I/FM). FIG. 2 shows a prior art tunnel junction sensor 200 which includes a first pinning layer 205, a first pinned layer 210, a first spacer layer 215, a free layer 220, a second spacer layer 225, a second pinned layer 230 and a second pinning layer 235. The magnetization of the outer two FM pinned layers are parallel while the magnetization of the internal FM free layer is either parallel or antiparallel. Modeling has shown that the double tunnel junction behaves differently than the traditional single tunnel junction by eliminating the effect of dc bias. FIG. 3 shows the TMR as a function of the dc bias for a double junction tunnel junction sensor.

While it appears that the multiple barriers have been shown to significantly eliminate the effect of dc bias, the double tunnel junction has drawbacks. For the spin polarized resonant tunneling phenomenon to work, the layers of the double tunnel junction must be made very thin. While it is desired to have thin layers, too thin a layer is detrimental to the device. For example, the center FM layer (traditionally the free layer) for the prior art is between 10 and 20 Å. With a layer this thin, the ferromagnetic free layer becomes saturated easily from external magnetic fields. Once saturated, the double tunnel junction sensor does not get the full benefit of the ferromagnetic free layer, the signals get clipped. It is preferable that the free layer never be saturated.

From the above discussion it becomes apparent that what is needed is a double tunnel junction sensor that provides the benefits of improved spin polarized tunneling and minimizing dc bias effects while also providing a device in which the internal layers are not saturated by an external magnetic field.

SUMMARY OF THE INVENTION

The present invention is directed toward an enhanced double tunnel junction structure that has enhancement layers causing resonant tunneling which boosts the magnetoresistance (MR), achieving higher tunnel magnetoresistance (TMR) for the structure. This is accomplished by using enhancement layers that create a quantum well between the enhancement layer and the pinned layer. By doing this, the tunneling constraints on the free layer are decoupled, allowing the free layer to be made thicker (>20 Å) and reducing or eliminating saturation from an external magnetic source.

In one embodiment, the resonant enhanced double tunnel junction sensor includes a first shield, a first pinning layer, a first pinned layer, a first enhancement layer, a first spacer layer, a free layer, a second spacer layer, a second enhancement layer, a second pinned layer, a second pinning layer and a second shield layer. In the preferred embodiment, the enhancement layer is made form copper (Cu). In another embodiment, the free layer is a multi-layered material having 75% NiFe and 25% $Co_{90}Fe_{10}$.

In the preferred embodiment, the magnetic moment of the first and second pinned layers are pinned by interfacial exchange with the magnetic spins of the first and second pinning layers in a downward direction, perpendicular to the ABS, while the magnetic moment of the free layer is perpendicular to the magnetic moment of the first and second pinned layers (i.e., the moment direction being parallel to the ABS). In use, a tunneling current $I_T$, using spin dependent electron tunneling, flows through the enhanced double tunnel junction sensor, using the first and second shield layers as leads. The amount of current $I_T$ that flows through is dependent on the relative magnetic moment directions between the first and second pinned layers and the free layer. In prior art double tunnel junctions, the free layer must be thin to perform properly and is prone to become saturated quickly from the external magnetic field. To solve this problem, the present invention adds enhancement layers of copper (Cu) to boost the magnetoresistivity (MR) of the sensor. The copper enhancement layers increase the spin polarized resonant tunneling, giving the structure a high TMR. With the higher TMR, the free layer may be made thicker and not saturate as easily. As the enhanced double tunnel junction sensor is positioned over the magnetic disk, the external magnetic fields sensed from the rotating disk moves the direction of magnetic moment of the free layer up or down, changing the resistance through the tunnel junction sensor. As the tunnel current $I_T$ is conducted through the sensor, the increase and decrease of electron tunneling (i.e., increase and decrease in resistance) are manifested as potential changes. These potential changes are then processed as readback signals by the processing circuitry.

Another embodiment of the present invention is an antiparallel (AP) resonant enhanced double tunnel junction sensor. This AP double tunnel junction sensor is similar to the double tunnel junction sensor described above but utilizes first and second AP pinned layers and in place of the first and second pinned layers. The AP pinned layer consists of a spacer made of ruthenium (Ru) between pinned film layers, preferably made of cobalt (Co). Because of the antiparallel features of the AP layers due to the Ru spacer layer, the magnetic moment of the one pinned film is antiparallel to magnetic moment of the other pinned film, which increases the effect of the sensor when the magnetic moment of the free layer rotates. In other embodiments, a combinations of pinned and AP pinned layers are used.

Other objects and advantages of the present invention will become apparent upon reading the following description taken together with the accompanying drawings.

DESCRIPTION OF THE PREFERRED EMBODIMENTS

Magnetic Disk Drive

Figure 1:
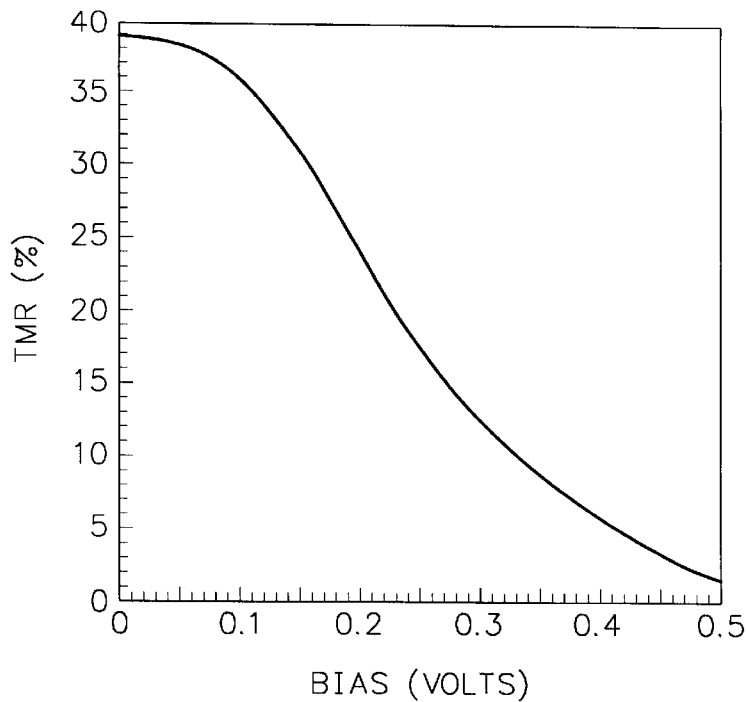
FIG. 1 is a graph of tunnel magnetoresistance (TMR) vs. dc bias for a traditional tunnel junction structure (FM/I/FM)
Figure 3:
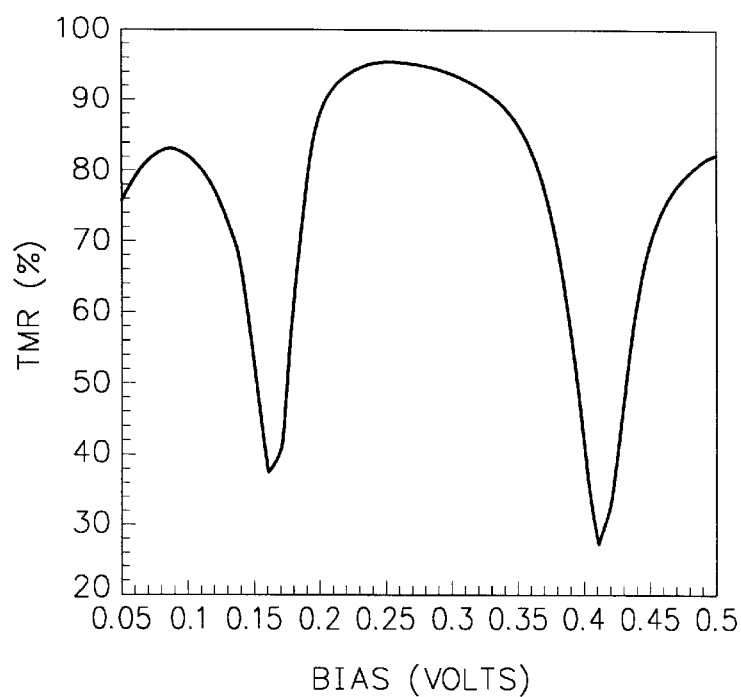
FIG. 3 is a graph of TMR vs. dc bias for the structure of FIG. 2.
Figure 2:
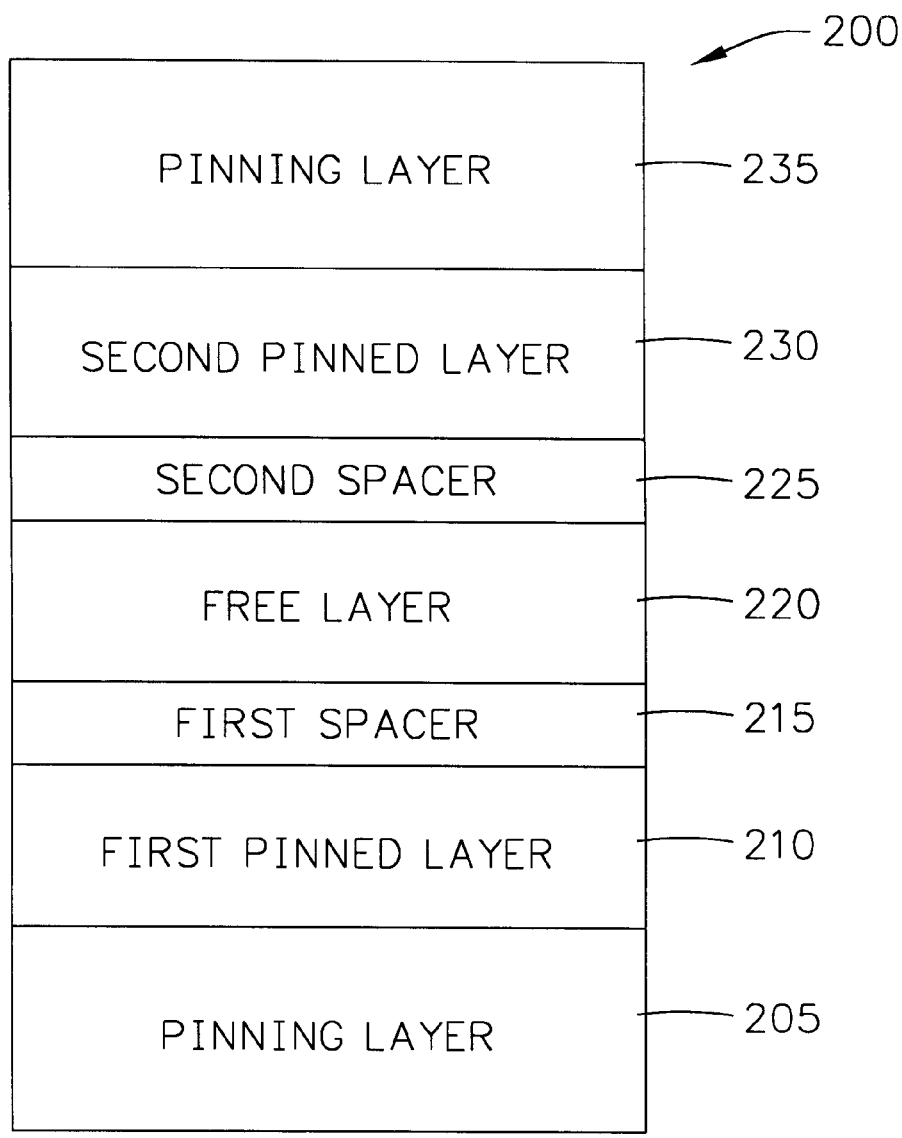
FIG. 2 is an air bearing surface (ABS) illustration of a prior art double tunnel junction structure (FM/I/FM/I/FM)
Figure 4:
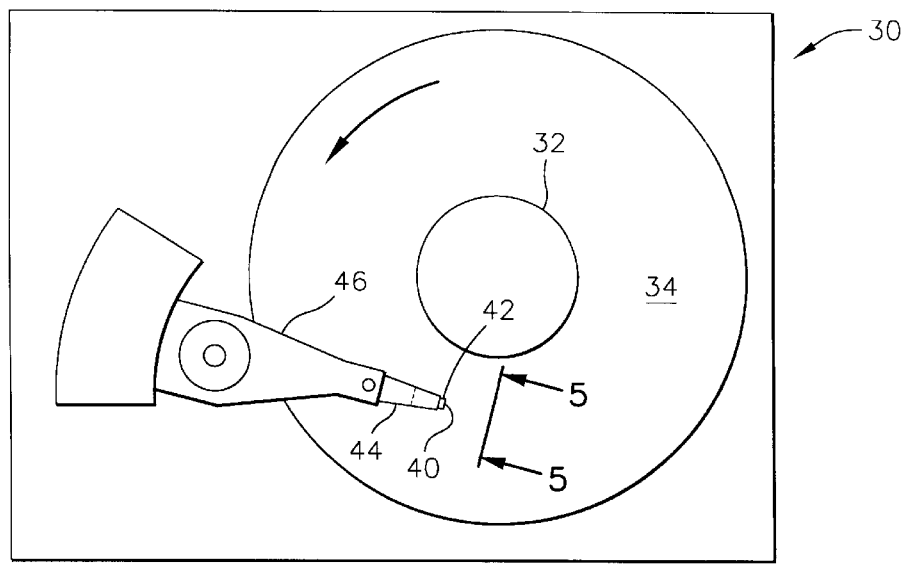
FIG. 4 is a plan view of an exemplary magnetic disk drive.
Figure 5:
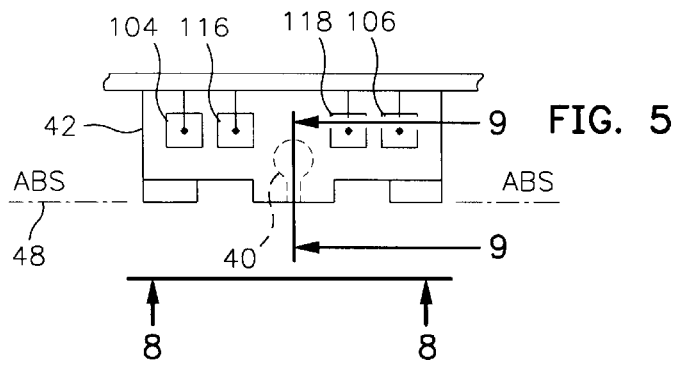
FIG. 5 is an end view of a slider with a magnetic head as seen in plane 5—5 of FIG. 4.
Figure 6:
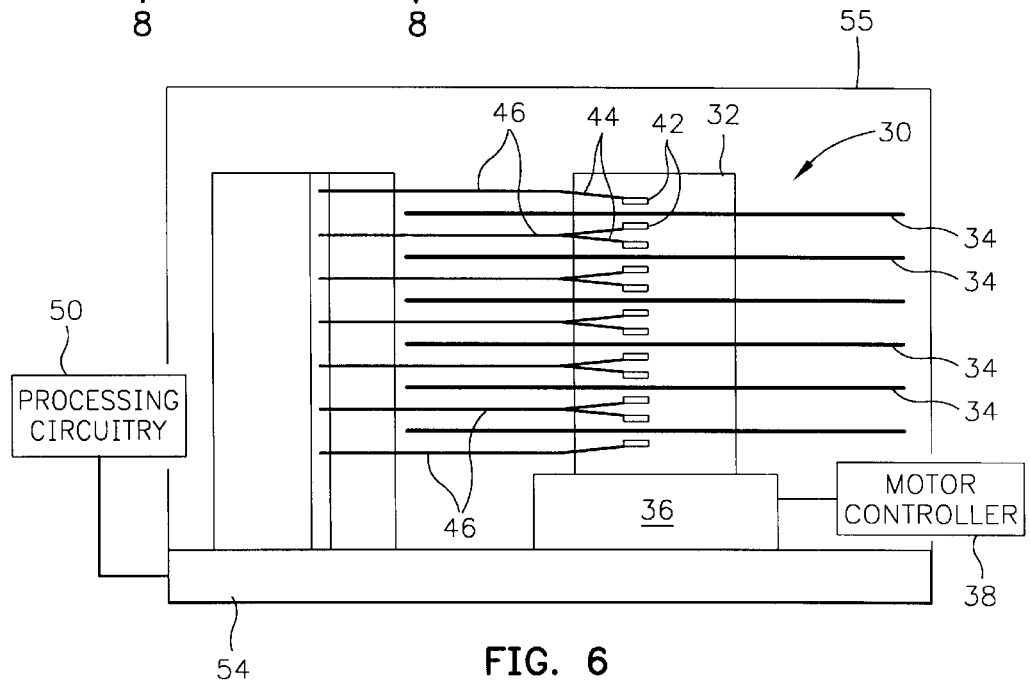
FIG. 6 is an elevation view of the magnetic disk drive wherein multiple disks and magnetic heads are employed in a housing.
Figure 7:
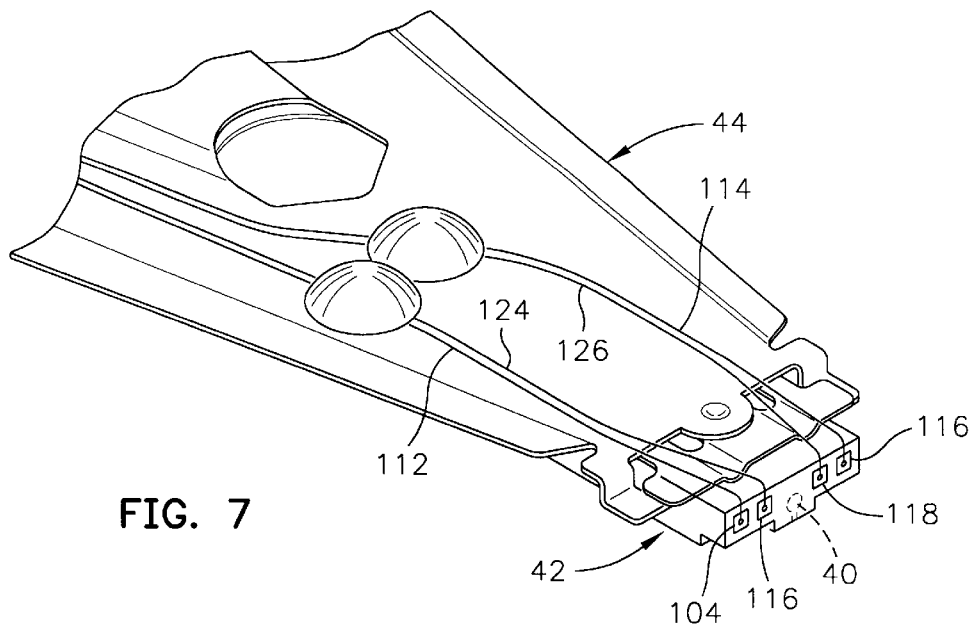
FIG. 7 is an isometric illustration of an exemplary suspension system for supporting the slider and magnetic head.

Referring now to the drawings wherein like reference numerals designate like or similar parts throughout the several views, FIGS. 4–6 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head (merged MR head) 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various circular tracks on the disk. FIG. 7 shows the mounting of the slider 42 to the suspension 44, which will be described hereinafter. The components described hereinabove may be mounted on a frame 54 of a housing 55, as shown in FIG. 6.

Figure 8:
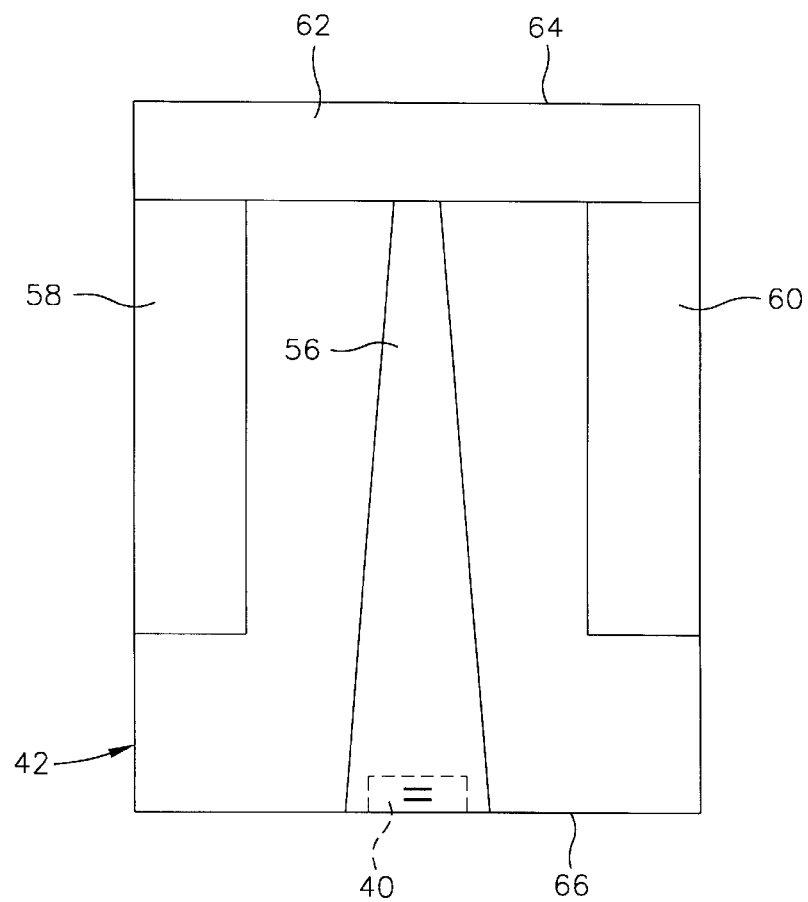
FIG. 8 is an ABS view of the slider taken along in plane 8—8 of FIG. 5.

FIG. 8 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 9:
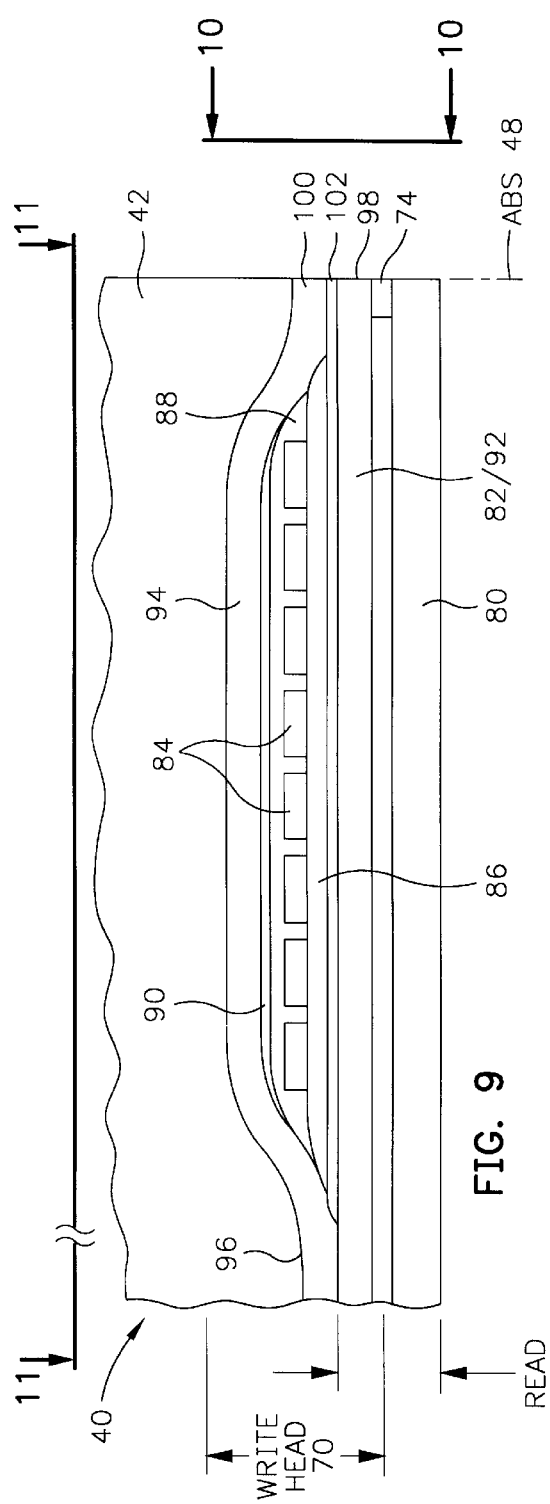
FIG. 9 a side view of a front portion of the magnetic head as seen in plane 9—9 of FIG. 5.
Figure 11:
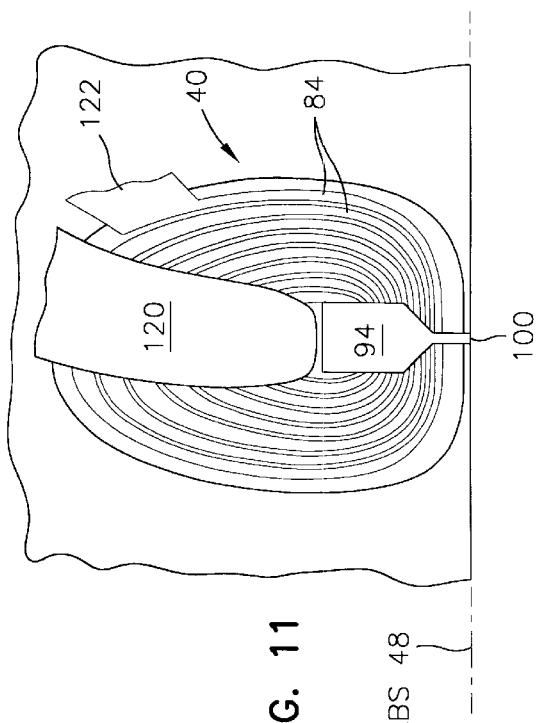
FIG. 11 is a view taken along plane 11—11 of FIG. 9 with all material above the coil layer and its leads removed.
Figure 10:
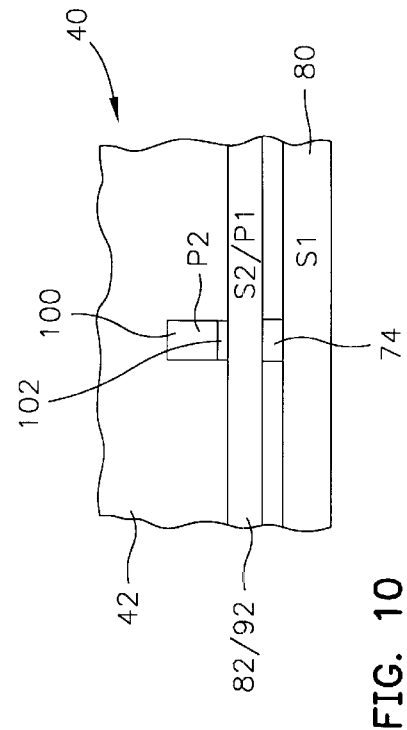
FIG. 10 is a partial ABS view of the slider taken along plane 10—10 of FIG. 9 to show the read and write elements of the magnetic head.

FIG. 9 is a cross-sectional elevation side view of a front portion of the merged MR head 40, which includes a write head portion 70 and a read head portion 72, the read head portion employing an enhanced double tunnel junction sensor 74 of the present invention. FIG. 10 is an ABS view of FIG. 9. The sensor 74 and insulating gap layer 75 are sandwiched between first and second shield layers 80 and 82. The insulating gap layer 75 insulates the shields from each other and may be made from aluminum oxide, aluminum nitride or silicone dioxide. In response to external magnetic fields from the rotating disk, the resistance of the tunnel junction sensor 74 changes. To determine the resistance, a tunneling current $I_T$ is used. The first and shield layers 80 and 82 are employed as leads. The current flows through all the layers of the tunnel junction between the leads (i.e., first and second shields). As the free layer rotates in response to the magnetic field from the disk, the resistance of the tunnel junction structure changes, altering the current through the structure. These resistance changes are manifested as potential changes. These potential changes are then processed as readback signals by the processing circuitry 50 shown in FIG. 6.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 5 and 7, first and second solder connections 104 and 116 connect leads from the tunnel junction sensor 74 to leads 112 and 124 on the suspension 44, and third and fourth solder connections 118 and 116 connect leads 120 and 122 from the coil 84 to leads 126 and 114 on the suspension.

Present Invention

Figure 12:
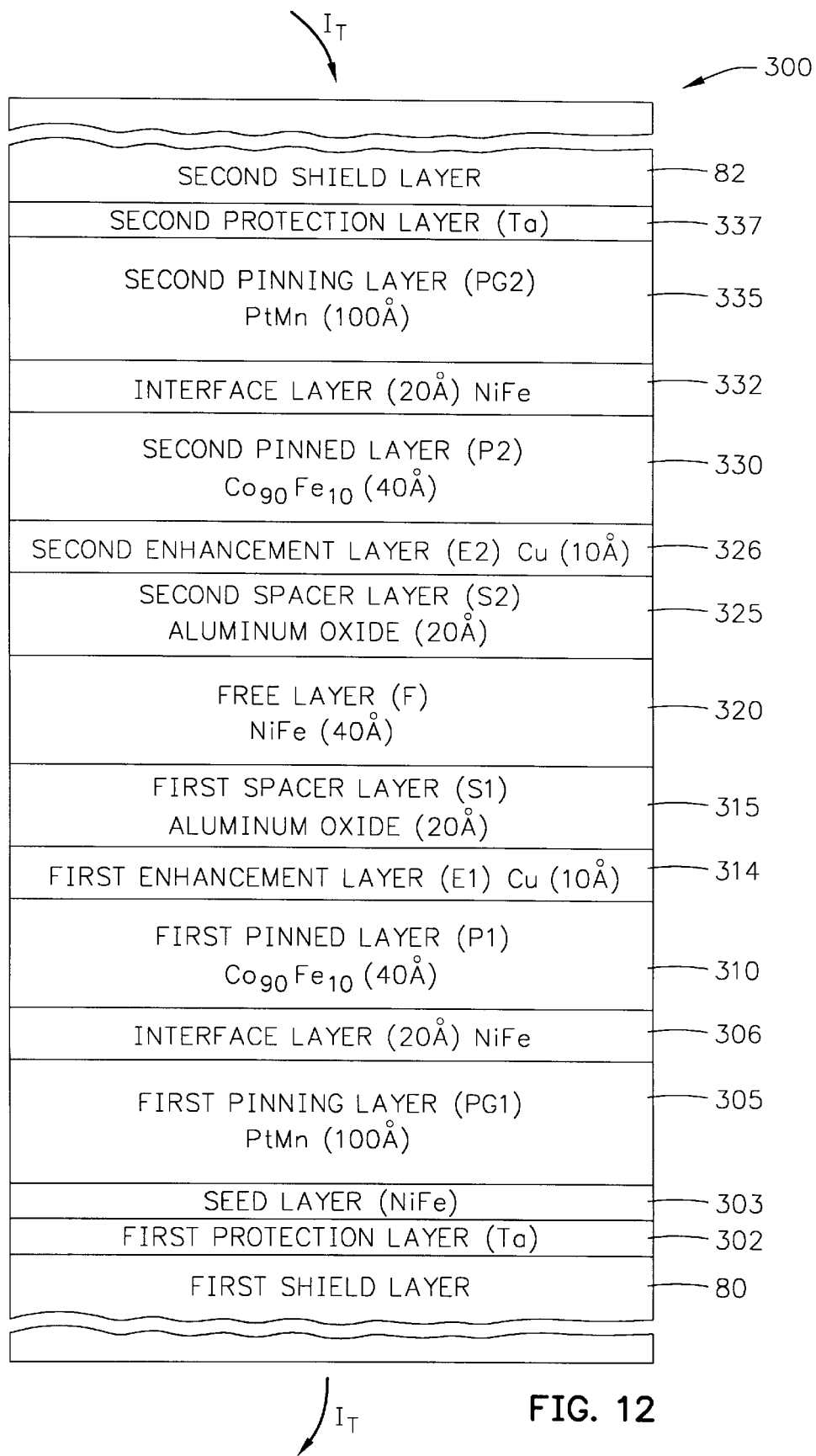
FIG. 12 is an air bearing surface (ABS) illustration of one embodiment of the sensor of the present invention.
Figure 14:
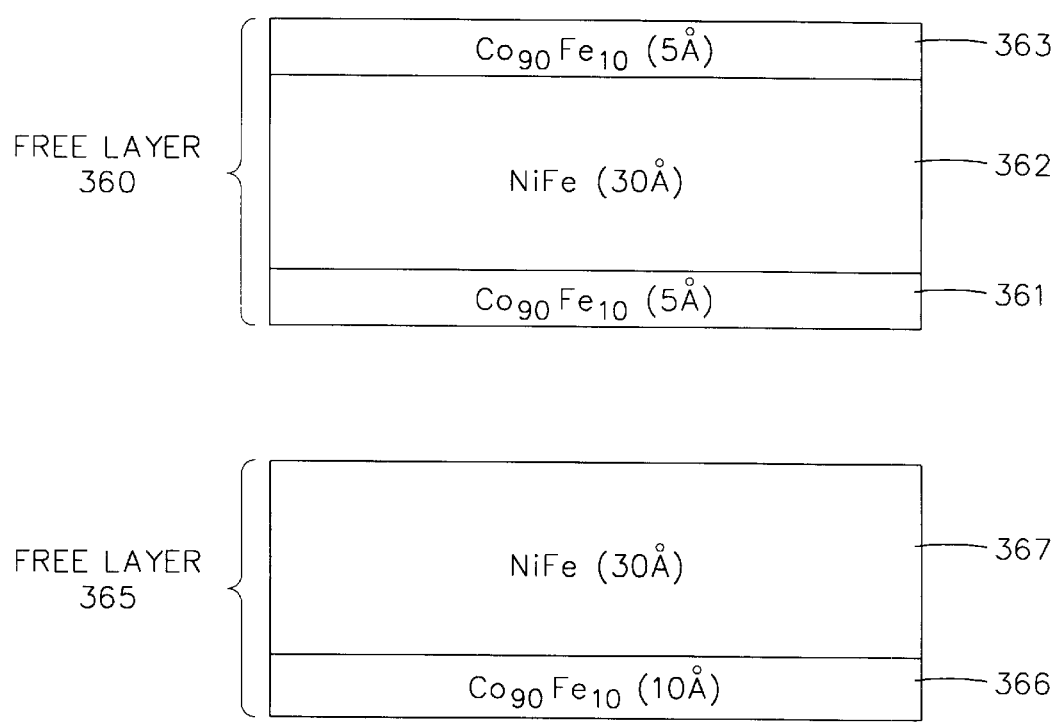
FIG. 14 is an illustration of alternate embodiments using multi-layer construction for the free layer.

The present invention is directed toward an enhanced double tunnel junction structure that has enhancement layers. These enhancement layers boost the MR to achieve a higher TMR for the structure. This is accomplished by using enhancement layers to create a quantum well between the enhancement layer and the pinned layer causing resonance which enhances the tunneling electrons. By doing this, the tunneling constraints on the free layer are decoupled, allowing the free layer to be made thicker (>20 Å) and reducing or eliminating saturation of the free layer from an external magnetic source. FIG. 12 shows one embodiment of the present invention of a resonant enhanced double tunnel junction sensor 300 which includes a first shield 80, a first protection layer 302 (if necessary), a seed layer 303 (if necessary), a first pinning layer 305, an interface layer 306, a first pinned layer 310, a first enhancement layer 314, a first spacer layer 315, a free layer 320, a second spacer layer 325, a second enhancement layer 326, a second pinned layer 330, an interface layer 332, a second pinning layer 335, a second protection layer 337 (if necessary) and a second shield layer 82. The first and second shields, 80 and 82, are made from a conductive material, such as Permalloy, which is $Ni_{80}Fe_{20}$. The first and second protection layers 302 and 337 are made of tantalum (Ta), having a thickness of 10–100 Å, with a preferred thickness of 50 Å. The protection layers are used to protect the sensor from damage during subsequent processing and to isolate the sensor from the shields. The protection layers are also known as de-coupling layers. Depending on the processing, the protection layers may not be necessary. The seed layer 303 is made of nickel iron (NiFe) with a thickness of 10–20 Å. The seed layer is used to control the grain size, texture and crystal structure. In certain instances, the seed layer may not be necessary. The first and second pinning layers, 305 and 335, are preferably made of an antiferromagnetic material, such as platinum manganese (PtMn), with a thickness range of 50–250 Å, preferably 100 Å. In the preferred embodiment, the magnetic spins of the first and second pinning layers are parallel with each other. Optionally, the pinning layers may be made of manganese iron (MnFe), nickel manganese (NiMn) or iridium manganese (IrMn). The interface layers 306 and 332 are made of nickel iron (NiFe), with a thickness of 10–30 Å, preferably 20 Å, and are used between the pinning layers and the pinned layers to enhance exchange coupling. The reason for the interface layers is that the pinning layer material has a stronger exchange coupling with the NiFe material than the pinned layer material. The first and second pinned layers, 310 and 330, are preferably made from a ferromagnetic material, such as cobalt iron ($Co_{90}Fe_{10}$), with a thickness of 20–60 Å, preferably 40 Å. Optionally, the pinned layers may be made from nickel iron (NiFe) or Cobalt (Co). The first pinned layer 310 is exchange coupled to the first pinning layer 305 and the second pinned layer 330 is exchange coupled to the second pinning layer 335. In the preferred embodiment, the magnetic moment of the first and second pinned layers, 310 and 330, are parallel. The first and second enhancement layers, 314 and 326, are preferably made of copper (Cu), with a thickness of 10 Å. Optionally the enhancement layers may be made from aluminum (Al) or any other conductive material that increases spin polarized resonant tunneling. The first and second spacer layers, 315 and 325, are preferably made of aluminum oxide, with a thickness of 10–30 Å, preferably 20 Å. The free layer 220 is made from nickel iron (NiFe), with a thickness of 30–100 Å, preferably 40 Å. Optional embodiments of the free layer use a multi-layer construction of material and thicknesses having 75% NiFe and 25% $Co_{90}Fe_{10}$. FIG. 14 shows examples of the multi-layer free layers. Multi-layer free layer 360 is comprised of a 5 Å cobalt iron ($Co_{90}Fe_{10}$) first layer 361, a 30 Å nickel iron (NiFe) second layer 362 and a 5 Å cobalt iron ($Co_{90}Fe_{10}$) third layer 363. Multi-layer free layer 365 is comprised of a 10 Å cobalt iron ($Co_{90}Fe_{10}$) first layer 366 and a 30 Å nickel iron (NiFe) second layer 367. While the above description presents material options for the various layers, it is understood that equivalent materials may be substituted and fall within the scope of the present invention.

In the preferred embodiment, the magnetic moment of the first and second pinned layers, 310 and 330, are pinned in a downward direction perpendicular to the ABS, due to interfacial exchange with the magnetic spins of the adjacent first and second pinning layers, 305 and 335. The magnetic moment of the free layer 320 is in a different direction than the pinned layers, such as a canted relationship, preferably perpendicular to the magnetic moment of the first and second pinned layers, 310 and 330 (i.e., the moment direction being parallel to the ABS). In use, a tunneling current $I_T$, using spin dependent electron tunneling, flows through the tunnel junction sensor 300, using the first and second shield layers, 80 and 82, used as leads. The amount of current $I_T$ that flows through is dependent on the relative magnetic moment directions between the first and second pinned layers 310 and 330 and the free layer 320. As the tunnel junction sensor 300 is positioned over the magnetic disk 34, the external magnetic fields sensed from the rotating disk 34 moves the direction of magnetic moment of the free layer 320 up or down, changing the resistance through the enhanced double tunnel junction sensor 300. The use of the resonant enhancement layers, 314 and 326, further enhance the change in resistance ($\Delta R/R$) of the enhanced double tunnel junction sensor 300. As the magnetic moment of the free layer 320 rotates up from the ABS (i.e., going toward the opposite direction of the magnetic moment of the first and second pinned layers, 310 and 330), the amount of electron tunneling decreases (i.e., the resistance increases). As the magnetic moment of the free layer 320 rotates down toward the ABS (i.e., going toward the same direction as the magnetic moment of the first and second pinned layers, 310 and 330), the amount of electron tunneling increases (i.e., the resistance decreases). As the tunnel current $I_T$ is conducted through the sensor 300, the increase and decrease of electron tunneling (i.e., increase and decrease in resistance) are manifested as potential changes. These potential changes are then processed as readback signals by the processing circuitry shown in FIG. 6. To boost the magnetoresistivity (MR) of the sensor 300, the copper (Cu) enhancement layers are positioned next to the spacer layers of aluminum oxide. The copper enhancement layers increase the spin polarized resonant tunneling, giving the structure a high TMR. With the higher TMR, the free layer may be made thicker and not saturate as easily.

Figure 13:
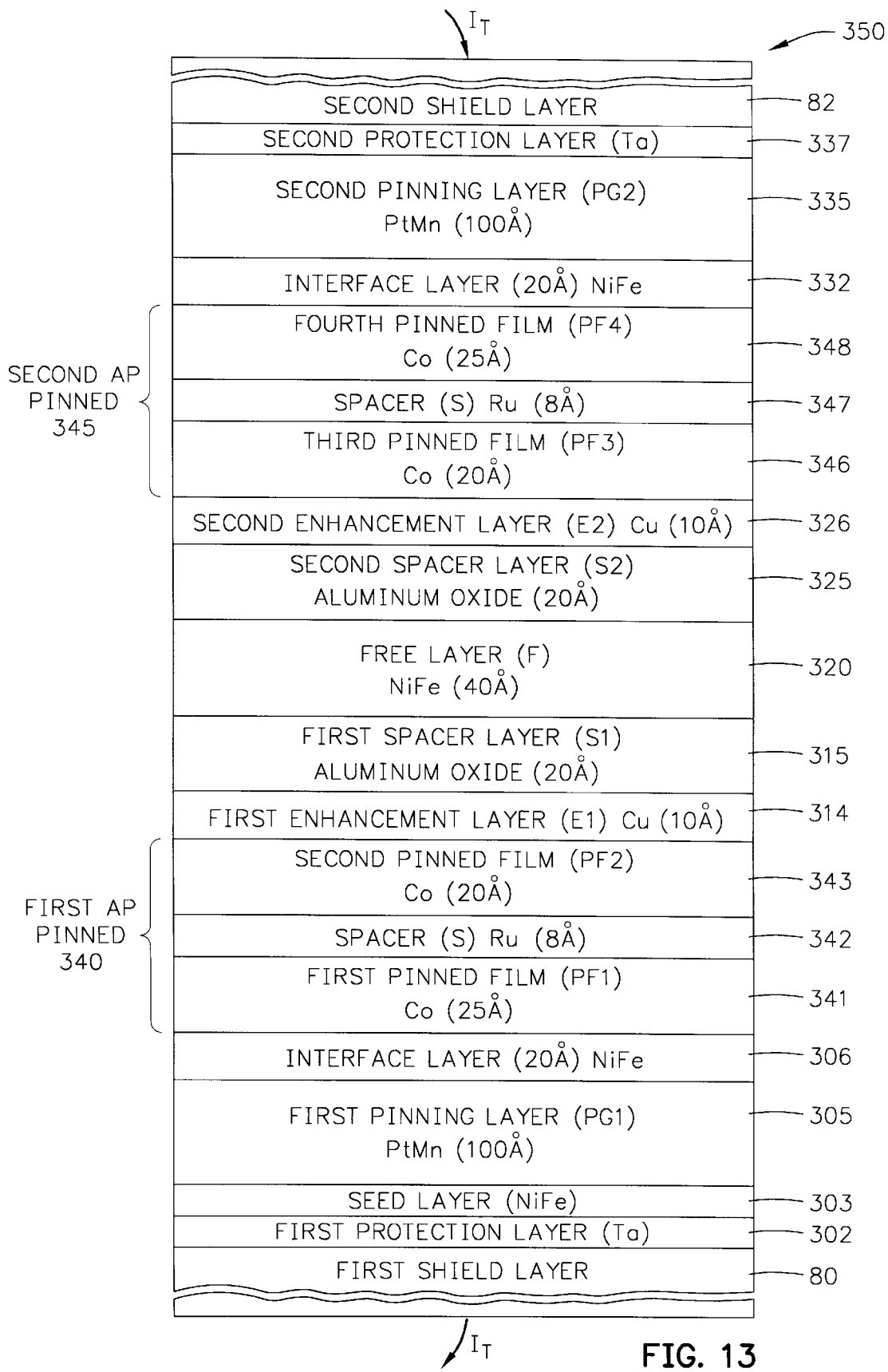
FIG. 13 is an air bearing surface (ABS) illustration of another embodiment of the sensor of the present invention.

FIG. 13 is another embodiment of the present invention showing an antiparallel (AP) resonant enhanced double tunnel junction sensor 350. This sensor double tunnel junction sensor 350 is similar to the double tunnel junction sensor 300 described above but utilizes a first and second AP pinned layers, 340 and 345, in place of the first and second pinned layers, 310 and 330. The first AP pinned layer 340 consists of a spacer 342, made of ruthenium (Ru), with a thickness of 8 Å, located between a first pinned film 341 and a second pinned film 343, preferably made of cobalt (Co), with a thickness of 25 Å and 20 Å respectively. The second AP pinned layer 345 consists of a spacer 347, made of ruthenium (Ru), with a thickness of 8 Å, located between a third pinned film 346 and a forth pinned film 348, preferably made of cobalt (Co), with a thickness of 20 Å and 25 Å respectively. Optionally, the pinned films may be made of nickel iron (NiFe). Because of the antiparallel features of the AP pinned layer 340 due to the Ru spacer layer, the magnetic moment of the first pinned film 341 is in the same direction as the magnetic spins of the first pinning layer 305 by interfacial exchange, while the magnetic moment of the second pinned film 343 is in an antiparallel direction. Similarly, the direction of the magnetic moment of the forth pinned layer 348 is pinned by interfacial exchange with the adjacent second pinning layer 335, with the preferred embodiment in a downward direction perpendicular to the ABS. Because of the antiparallel features of the AP pinned layer 345 due to the spacer layer 347, the magnetic moment of the third pinned film 346 is antiparallel to magnetic moment of the fourth pinned film 348. Having the magnetic moments of the second and third pinned film layers 343 and 346, antiparallel to the magnetic moments of the first and fourth pinned film layers, 341 and 348, increases effect of the sensor when the magnetic moment of the free layer 320 rotates. In another embodiment, a combination of a pinned layer (310 or 330) and an AP pinned layer (340 or 345) is used. In this embodiment, the pinned layer 310 is used with AP pinned layer 345 or the pinned layer 330 is used with AP pinned layer 340. In still another embodiment, the multi-layer free layer 360 or 365 (see FIG. 14) is used with AP pinned layers 340 and 345 or used with the combination of the pinned layer (310 or 330) and AP pinned layer (340 or 345), as described above.

Clearly, other embodiments and modifications of this invention will occur readily to those of ordinary skill in the art in view of these teachings. While the description of the enhanced double tunnel junction sensor is described in relation to a magnetic disk drive read/write head, it should understood that in other applications, the enhanced double tunnel junction sensor may be used alone or in combination with other devices. Therefore, the disclosed invention is to be considered merely illustrative and limited in scope only as specified in the appended claims.

What is claimed is:

1. A method of making a resonant enhanced double tunnel sensor that has an air bearing surface (ABS) comprising:

forming an electrically conductive first shield layer;

forming an electrically conductive first antiferromagnetic pinning layer on the first shield layer, the first pinning layer having magnetic spins oriented in a first predetermined direction;

forming an electrically conductive first ferromagnetic pinned layer on the pinning layer that is exchange coupled to the first pinning layer so that a magnetic moment of the first pinned layer is pinned in the first predetermined direction;

forming a first enhancement layer capable of enhancing spin polarized resonant tunneling on the first pinned layer;

forming a first spacer layer on the first enhancement layer;

forming a ferromagnetic free layer on the first spacer layer, the free layer having a magnetic moment in a second predetermined direction, the second predetermined direction being different than the first predetermined direction, the magnetic moment being free to rotate relative to the second predetermined direction in response to an applied magnetic field;

forming a second spacer layer on the free layer;

forming a second enhancement layer capable of enhancing spin polarized resonant tunneling on the second spacer layer;

forming an electrically conductive second ferromagnetic pinned layer on the second enhancement layer;

forming an electrically conductive second antiferromagnetic pinning layer on the pinned layer, the second pinning layer having magnetic spins oriented in the first predetermined direction and by exchange coupling pins the magnetic moment of the second pinned layer in the first predetermined direction; and forming an electrically conductive second shield layer on the pinning layer.

2. A method as claimed in claim 1 wherein the electrically conductive first and second antiferromagnetic pinning layers are formed with a thickness from 50 Å to 250 Å.

3. A method as claimed in claim 2 wherein the conductive antiferromagnetic pinning layers are selected from the group PtMn, MnFe, NiMn, and IrMn.

4. A method as claimed in claim 1 wherein the electrically conductive first and second ferromagnetic pinned layers are formed with a thickness from 20 Å to 60 Å.

5. A method as claimed in claim 4 wherein the ferromagnetic pinned layers are selected from the group consisting of $Co_{90}Fe_{10}$, NiFe and Co.

6. A method as claimed in claim 1 wherein the first ferromagnetic pinned layer is a first antiparallel (AP) pinned layer that is made by:

forming a ruthenium (Ru) film layer and first and second ferromagnetic pinned film layers with the ruthenium film layer located between the first and second pinned film layers and the first pinned film layer exchange coupled to the first pinning layer so that a magnetic moment of the first pinned film layer is pinned in said first predetermined direction and a magnetic moment of the second pinned film layer is pinned in a third predetermined direction which is antiparallel to the first predetermined direction.

7. A method as claimed in claim 6, wherein the first and second pinned film layers are made from cobalt (Co).

8. A method as claimed in claim 7 wherein the first and second pinned film layers are formed with a thickness of 25 Å and 20 Å respectively and the ruthenium film layer has a thickness of 8 Å.

9. A method as claimed in claim 6 wherein the second ferromagnetic pinned layer is a second antiparallel (AP) pinned layer that is made by:

forming a ruthenium (Ru) film layer and third and fourth ferromagnetic pinned film layers with the ruthenium film layer located between the third and fourth pinned film layers and the fourth pinned film layer exchange coupled to the second pinning layer so that a magnetic moment of the fourth pinned film layer is pinned in said first predetermined direction and a magnetic moment of the third pinned film layer is pinned in said third predetermined direction which is antiparallel to the first predetermined direction.

10. A method as claimed in claim 9 wherein the third and fourth pinned film layers are made from cobalt (Co).

11. A method as claimed in claim 10 wherein the forming of the ferromagnetic free layer includes the steps of forming a NiFe based film and first and second Co based films with the NiFe based film located between and interfacing the first and second Co based films.

12. A method as claimed in claim 1 wherein the first and second enhancement layers are formed with a thickness of 10 Å.

13. A method as claimed in claim 12 wherein the enhancement layers are made from Cu or Al.

14. A method as claimed in claim 1 wherein the first and second spacer layers are formed with a thickness from 10 Å to 30 Å.

15. A method as claimed in claim 14 wherein the spacer layers are made from aluminum oxide.

16. A method as claimed in claim 1 wherein the ferromagnetic free layer is formed with a thickness from 30 Å to 100 Å.

17. A method as claimed in claim 16 wherein the ferromagnetic free layer is made from NiFe.

18. A method as claimed in claim 1 wherein the forming of the ferromagnetic free layer includes forming a NiFe based film and first and second Co based films with the NiFe based film located between and interfacing the first and second Co based films.

19. A method as claimed in claim 1 wherein the first and second shields are made from Permalloy ($Ni_{80}Fe_{20}$).

20. A method as claimed in claim 1 wherein the first predetermined direction is normal to the ABS.

21. A method of making a magnetic head that has an air bearing surface (ABS) comprising:
   forming a double tunnel junction read head that includes:
      forming an electrically conductive first shield layer;
      forming an electrically conductive first antiferromagnetic pinning layer on the first shield layer, the first pinning layer having magnetic spins oriented in a first predetermined direction;
      forming an electrically conductive first ferromagnetic pinned layer on the pinning layer, the first pinned layer exchange coupled to the first pinning layer so that a magnetic moment of the first pinned layer is pinned in the first predetermined direction;
      forming a first enhancement layer capable of enhancing spin polarized resonant tunneling on the first pinned layer;
      forming first spacer layer on the first enhancement layer;
      forming a ferromagnetic free layer on the first spacer layer, the free layer having a magnetic moment in a second predetermined direction, the second predetermined being different than the first predetermined direction, the magnetic moment being free to rotate relative to the second predetermined direction in response to an applied magnetic field;
      forming a second spacer layer on the free layer;
      forming a second enhancement layer capable of enhancing spin polarized resonant tunneling on the spacer layer;
      forming an electrically conductive second ferromagnetic pinned layer on the second enhancement layer;
      forming an electrically conductive second antiferromagnetic pinning layer on the pinned layer, the second pinned layer having magnetic spins oriented in the first predetermined direction and by exchange coupling pins the magnetic moment of the second pinned layer in the first predetermined direction; and
      forming an electrically conductive second shield layer;
   forming a write head as follows:
      forming a write gap layer and an insulation stack with a coil layer embedded therein on the second shield layer so that the second shield layer also functions as a first pole piece for the write head; and
      forming a second pole piece layer on the insulation stack and the write gap and connected at a back gap to the first pole piece.

22. A method as claimed in claim 1 wherein the electrically conductive first and second antiferromagnetic pinning layers are formed with a thickness from 50 Å to 250 Å.

23. A method as claimed in claim 22 wherein the conductive antiferromagnetic pinning layers are selected from the group PtMn, MnFe, NiMn, and IrMn.

24. A method as claimed in claim 21 wherein the electrically conductive first and second ferromagnetic pinned layers are formed with a thickness from 20 Å to 60 Å.

25. A method as claimed in claim 24 wherein the ferromagnetic pinned layers are selected from the group consisting of $Co_{90}Fe_{10}$, NiFe and Co.

26. A method as claimed in claim 21 wherein the first ferromagnetic pinned layer is a first antiparallel (AP) pinned layer that is made by:
   forming a ruthenium (Ru) film layer and first and second ferromagnetic pinned film layers with the ruthenium film layer located between the first and second pinned film layers and the first pinned film layer exchange coupled to the first pinning layer so that a magnetic moment of the first pinned film layer is pinned in said first predetermined direction and a magnetic moment of the second pinned film layer is pinned in a third predetermined direction which is antiparallel to the first predetermined direction.

27. A method as claimed in claim 26 wherein the first and second pinned film layers are made from cobalt (Co).

28. A method as claimed in claim 27 wherein the first and second pinned film layers are formed with a thickness of 25 Å and 20 Å respectively and the ruthenium layer has a thickness of 8 Å.

29. A method as claimed in claim 26 wherein the second ferromagnetic pinned layer is a second antiparallel (AP) pinned layer that is made by:
   forming a ruthenium (Ru) film layer and third and fourth ferromagnetic pinned film layers with the ruthenium film layer located between the third and fourth pinned film layers and the fourth pinned film layer exchange coupled to the second pinning layer so that a magnetic moment of the fourth pinned film layer is pinned in said first predetermined direction and a magnetic moment of the third pinned film layer is pinned in said third predetermined direction which is antiparallel to the first predetermined direction.

30. A method as claimed in claim 29 wherein the third and fourth pinned film layers are made from cobalt (Co).

31. A method as claimed in claim 30 wherein the forming of the ferromagnetic free layer includes the steps of forming a NiFe based film and first and second Co based films with the NiFe based film located between and interfacing the first and second Co based films.

32. A method as claimed in claim 21 wherein the first and second enhancement layers are formed with a thickness of 10 Å.

33. A method as claimed in claim 32 wherein the enhancement layers are made from Cu or Al.

34. A method as claimed in claim 21 wherein the first and second spacer layers are formed with a thickness from 10 Å to 30 Å.

35. A method as claimed in claim 34 wherein the spacer layers are made from aluminum oxide.

36. A method as claimed in claim 21 wherein the ferromagnetic free layer is formed with a thickness from 30 Å to 100 Å.

37. A method as claimed in claim 36 wherein the ferromagnetic free layer is made from NiFe.

38. A method as claimed in claim 21 wherein the forming of the ferromagnetic free layer includes forming a NiFe based film and first and second Co based films with the NiFe based film located between and interfacing the first and second Co based films.

39. A method as claimed in claim 21 wherein the first and second shields are made from Permalloy ($Ni_{80}Fe_{20}$).

40. A method as claimed in claim 21 wherein the first predetermined direction is normal to the ABS.

* * * * *